(12) United States Patent
Vander Horst

(10) Patent No.: US 12,259,266 B1
(45) Date of Patent: Mar. 25, 2025

(54) MULTI-TANK INDIRECT LIQUID LEVEL MEASUREMENT SYSTEM AND METHOD FOR HOLDING TANKS IN A RECREATIONAL VEHICLE

(71) Applicant: John Vander Horst, Denver, CO (US)

(72) Inventor: John Vander Horst, Denver, CO (US)

(*) Notice: Subject to any disclaimer, the term of this patent is extended or adjusted under 35 U.S.C. 154(b) by 0 days.

(21) Appl. No.: 18/749,954

(22) Filed: Jun. 21, 2024

(51) Int. Cl.
*G01F 23/14* (2006.01)
*B60R 16/033* (2006.01)
*G01F 23/18* (2006.01)
*B60N 3/18* (2006.01)
*B60R 15/02* (2006.01)
*B60R 15/04* (2006.01)

(52) U.S. Cl.
CPC ............ *G01F 23/18* (2013.01); *B60R 16/033* (2013.01); *B60N 3/18* (2013.01); *B60R 15/02* (2013.01); *B60R 15/04* (2013.01)

(58) Field of Classification Search
CPC .... G01F 23/165; G01F 23/168; H01H 35/346
See application file for complete search history.

(56) References Cited

U.S. PATENT DOCUMENTS

| | | | |
|---|---|---|---|
| 2,327,373 A * | 8/1943 | Samiran | F02M 37/0023 222/129 |
| 2,518,484 A | 8/1950 | Matthews | |
| 3,402,271 A * | 9/1968 | Maas | H01H 35/346 200/83 Z |
| 3,587,316 A * | 6/1971 | Kapteyn | G01F 23/165 73/302 |
| 4,064,752 A * | 12/1977 | Murphy, Jr. | G01F 23/167 73/302 |
| 4,132,237 A * | 1/1979 | Kennedy | F16K 17/22 137/75 |
| 4,147,893 A * | 4/1979 | Matson | B67D 7/06 73/302 |
| 4,181,831 A * | 1/1980 | Mayer | H01H 35/346 200/61.25 |
| 4,665,746 A * | 5/1987 | Sheppard | G01F 23/167 73/302 |
| 6,510,736 B1 * | 1/2003 | Van Ee | B67C 3/04 73/302 |
| 6,935,044 B2 * | 8/2005 | Dougherty | G01F 23/04 33/728 |
| 9,134,163 B2 | 9/2015 | Vander Horst | |
| 9,534,945 B2 | 1/2017 | Vander Horst | |
| 2014/0228762 A1 * | 8/2014 | Capone | A61M 5/16881 604/152 |

(Continued)

FOREIGN PATENT DOCUMENTS

DE   2746255 A1 *  4/1978
EP   0992688 A2 *  4/2000

*Primary Examiner* — Herbert K Roberts

(57) ABSTRACT

A system and method for measuring liquid levels in a plurality of recreational vehicle holding tanks uses an electric air pump and a selection unit to measure the air pressure required to selectively pump air to the bottom of the holding tanks. The electric air pump is actuated using a user-operated electrical switch and is shut off by a normally-closed pressure switch when the air pressure at the outlet of the electric air pump exceeds a threshold. The liquid level in each tank can be measured using a pressure gage that reads the air pressure downstream of the electric air pump, which equals the pressure of the liquid at the bottom of each tank.

20 Claims, 13 Drawing Sheets

(56) References Cited

U.S. PATENT DOCUMENTS

2015/0198475 A1\* 7/2015 Vander Horst ....... G01F 23/165
                                                    73/302
2018/0289870 A1\* 10/2018 Beasley ................ H01H 35/38
2020/0278038 A1\* 9/2020 Messner ............ B63C 11/2245

\* cited by examiner

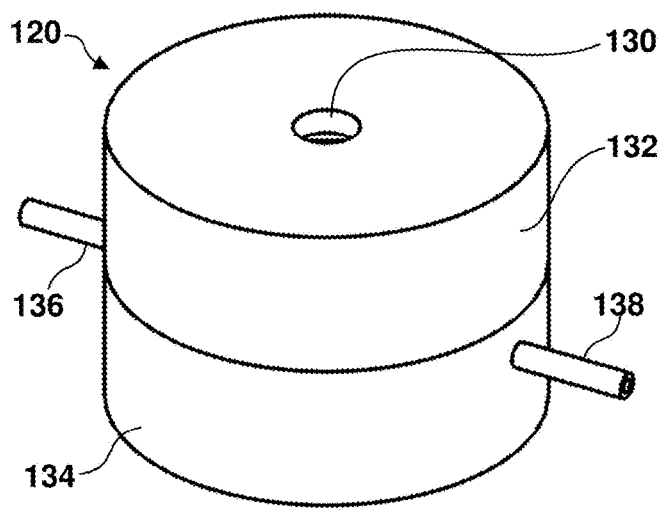
FIG. 3A
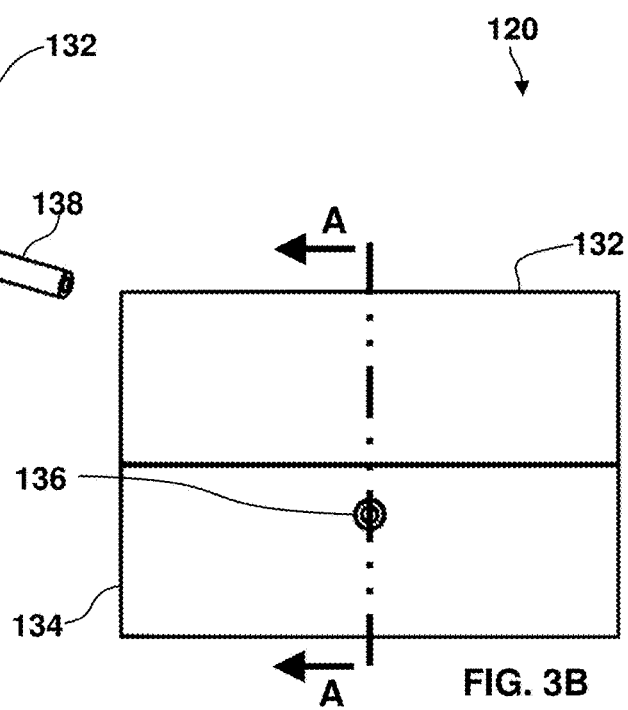
FIG. 3B
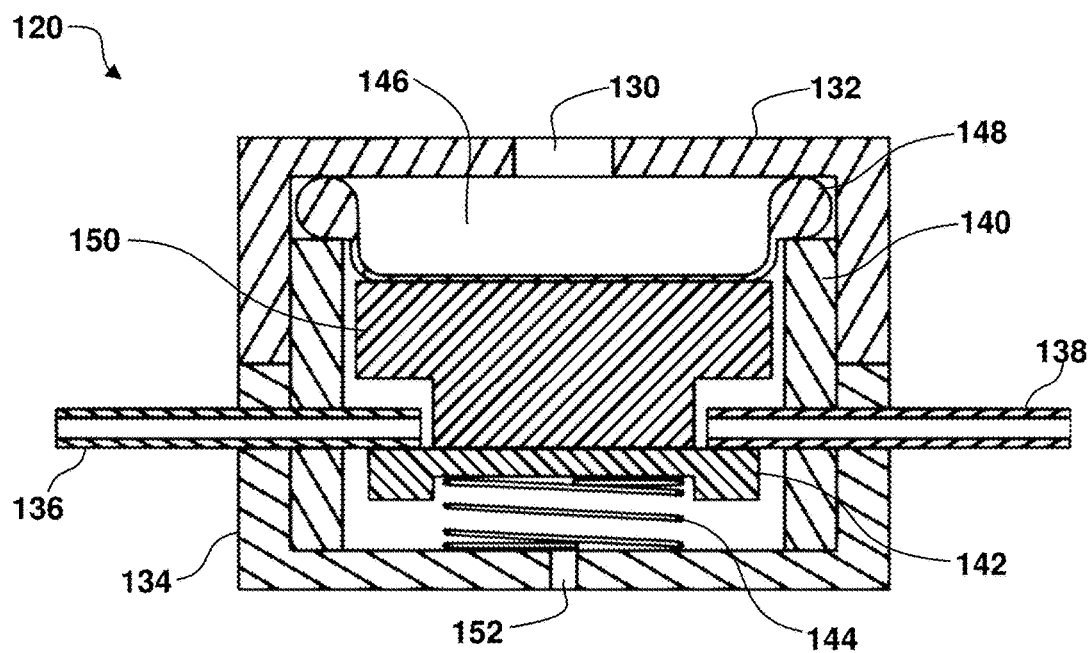
FIG. 3C (Section A-A)

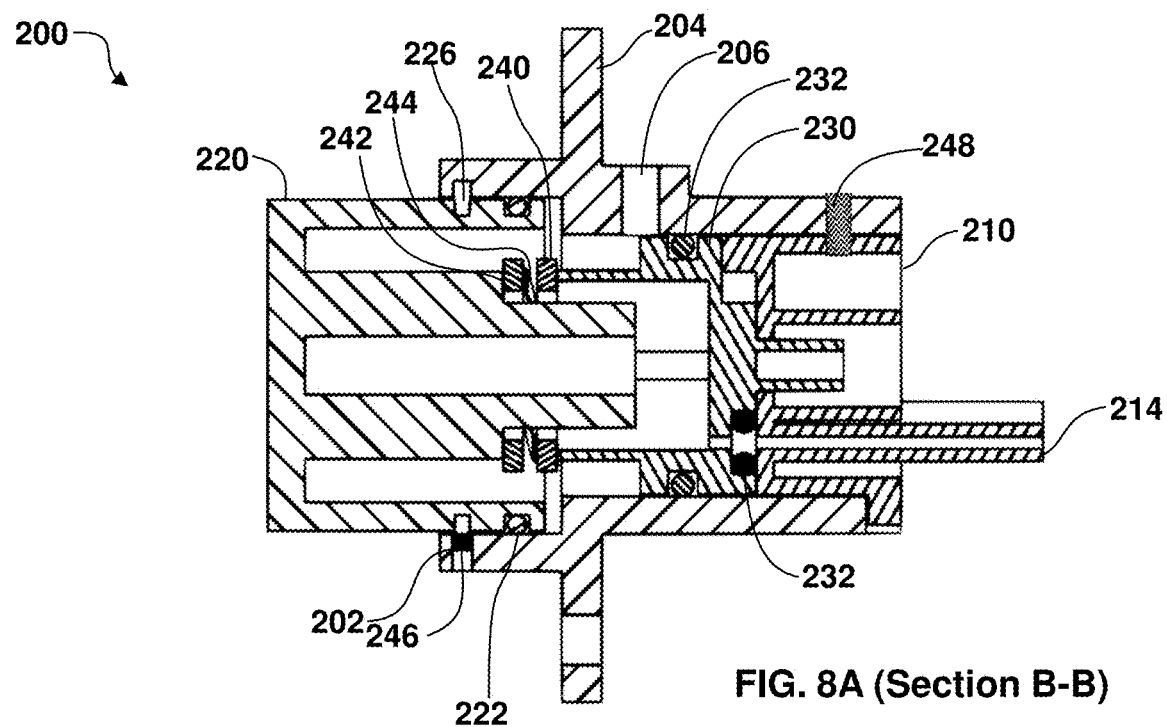
FIG. 8A (Section B-B)
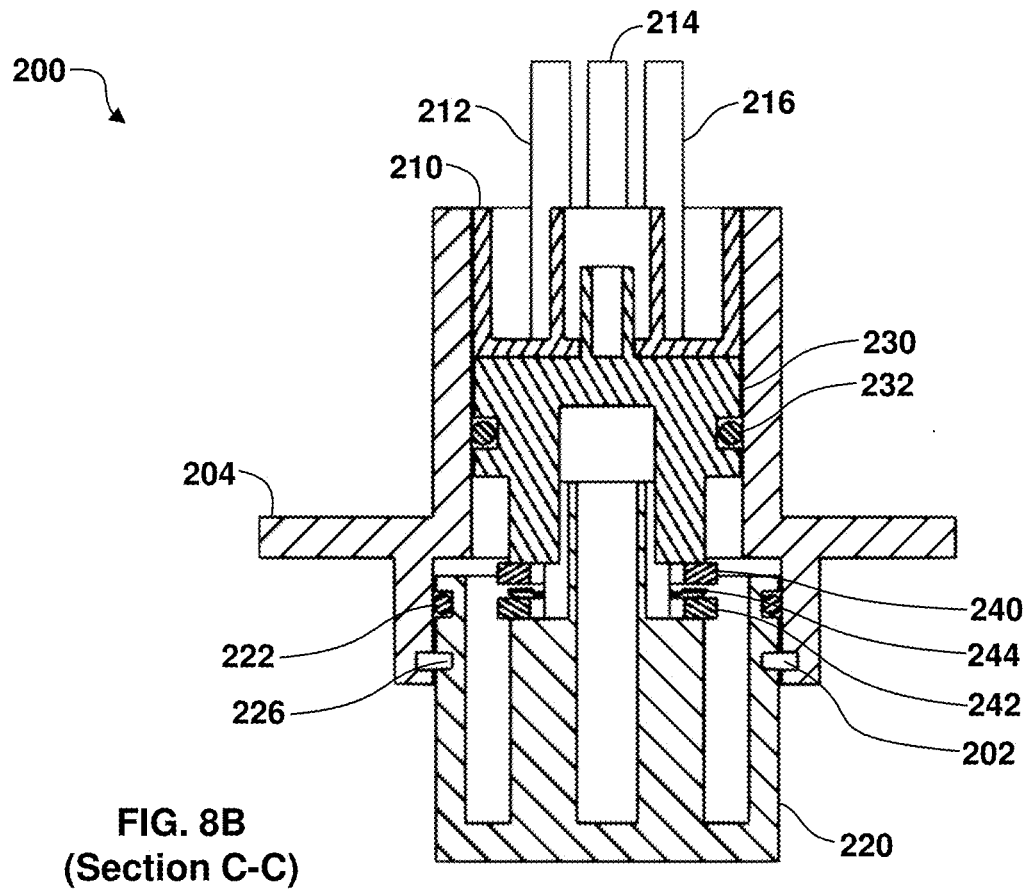
FIG. 8B (Section C-C)

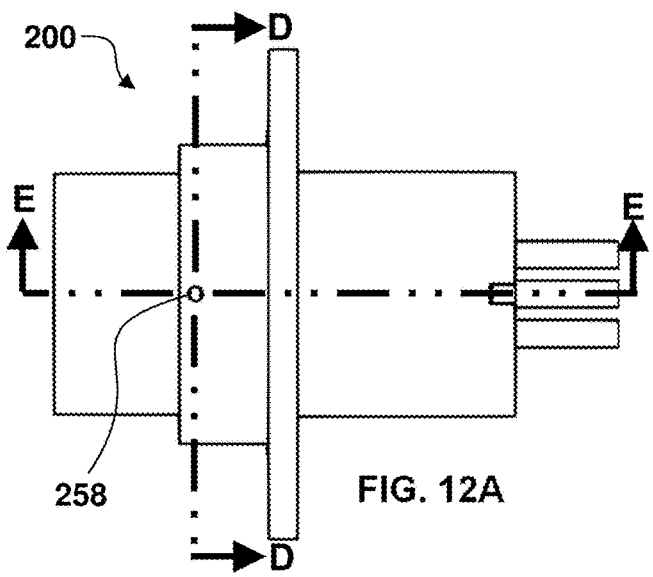
FIG. 12A
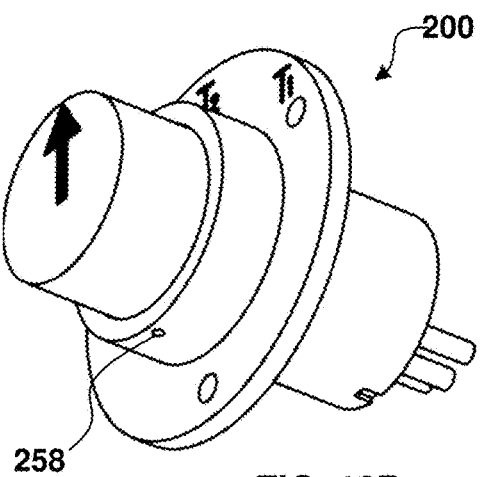
FIG. 12B
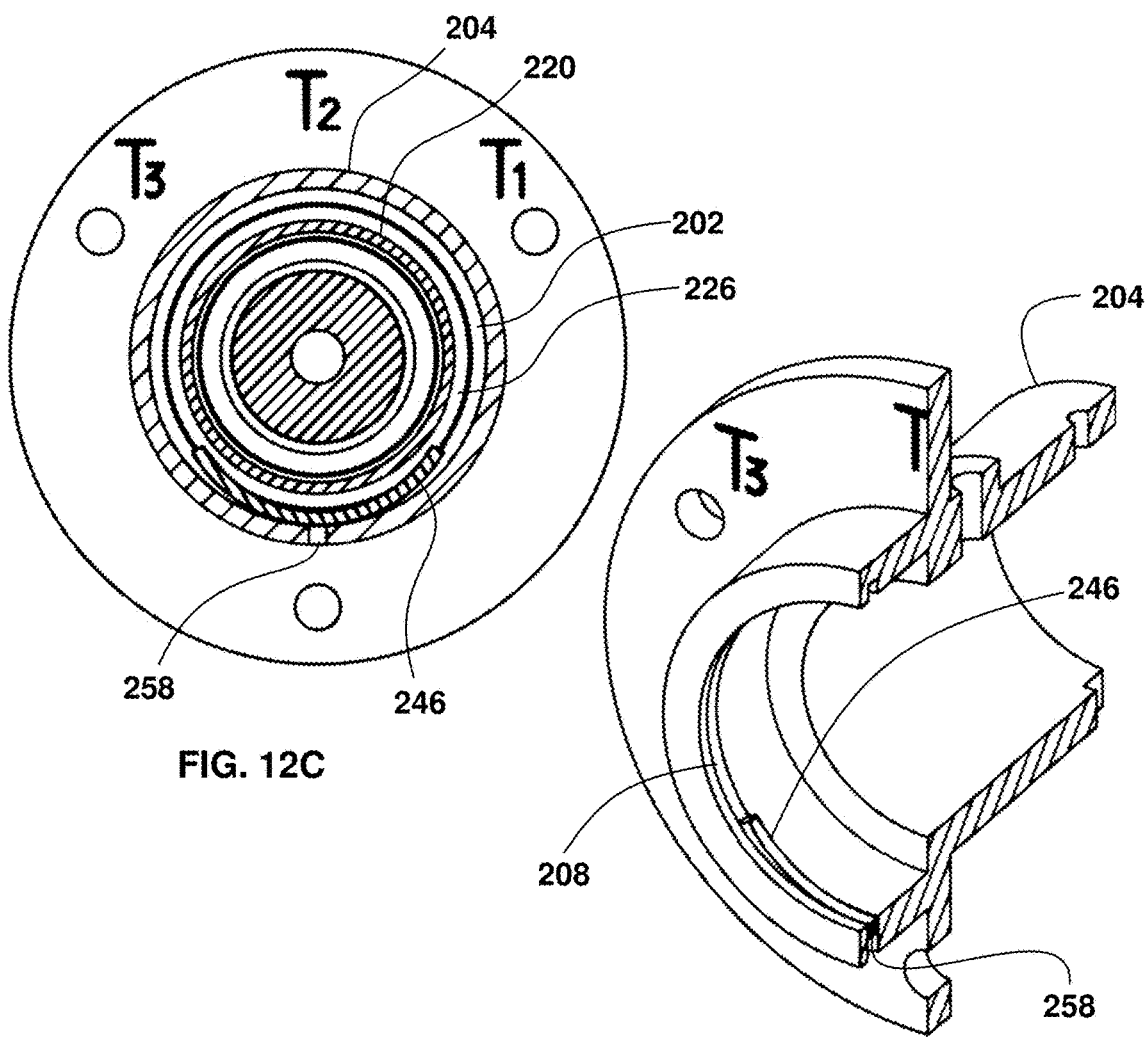
FIG. 12C
FIG. 12D

MULTI-TANK INDIRECT LIQUID LEVEL MEASUREMENT SYSTEM AND METHOD FOR HOLDING TANKS IN A RECREATIONAL VEHICLE

BACKGROUND

The invention(s) disclosed herein relate to the measurement of liquid levels in recreational vehicle holding tanks.

Most recreational vehicles, such as campers, trailers, fifth wheelers, and motor homes normally have three holding tanks, one for freshwater, one for gray water, and one for black water. The fresh water is for human consumption. The gray water is for wastewater from the kitchen and shower. The black water for human waste from the toilet.

The effluent stored in black water and gray water tanks can easily clog or render inoperable a liquid level measurement apparatus or sensors in direct contact with the wastewater. Examples of typical direct wastewater measurement devices are ones that use conductance, capacitance, floats, or other direct means for measuring the liquid in a tank. Despite the numerous cleaning methods and chemicals that have been developed, many existing wastewater level measuring methods and systems can fail within several weeks, resulting in the recreational vehicle owner draining the wastewater tank or tanks too frequently or running the risk of a tank overflow.

As an alternative to direct liquid level measurement, it is possible to measure a liquid level indirectly from the pressure of a liquid at the bottom of a tank or reservoir. Indirect liquid level measurement systems for recreational vehicles exist. Examples include U.S. Pat. Nos. 9,134,163, and 9,534,945 by John Vander Horst. These devices work, but it was desired to make an improved device that is capable of measuring the liquid level in multiple tanks (both freshwater and wastewater) using a single gage. The system needs to be easy to install in a recreational vehicle. It needs to be accurate, reliable, easy-to-use, and as inexpensive as possible.

BRIEF DESCRIPTION OF THE DRAWINGS

The present disclosure is described in conjunction with the appended figures in which:

FIG. 3A shows an isometric view of the normally-closed pressure switch of FIG. 2;

FIG. 3B shows a side view of the normally-closed pressure switch;

FIG. 3C shows section A-A of FIG. 3B;

FIG. 8A and FIG. 8B are section views of the tank selection unit;

FIG. 12A, FIG. 12B, FIG. 12C, and FIG. 12D show details of the retainer clip used in one embodiment of the tank selection unit.

Figure 1A:
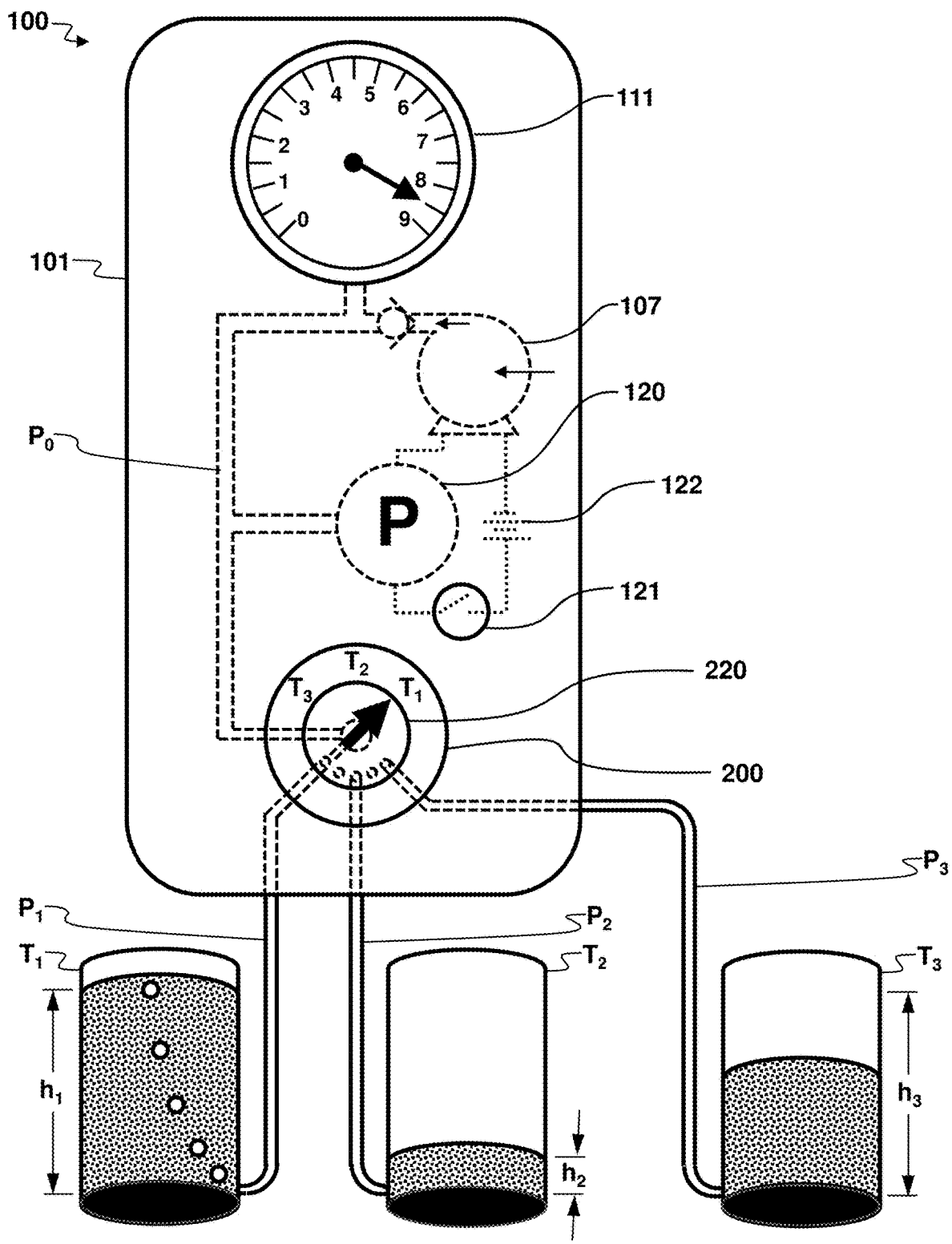
FIG. 1A shows a front view of a multi-tank indirect liquid level measurement system when a tank selection unit has been set to measure the liquid level in a first tank.

It should be understood that the drawings are not necessarily to scale. In certain instances, details that are not necessary for an understanding of the invention or that render other details difficult to perceive may have been omitted. It should be understood that the invention is not necessarily limited to the particular embodiments illustrated herein.

To assist in the understanding of one embodiment of the present invention, the following list of components or features and associated numbering found in the drawings is provided herein:

| Number | Component or Feature |
| --- | --- |
| $h_1$ | First height |
| $h_2$ | Second height |
| $h_3$ | Third height |
| $P_0$ | Main pipe |
| $P_1$ | First pipe |
| $P_2$ | Second pipe |
| $P_3$ | Third pipe |
| $T_1$ | First tank |
| $T_2$ | Second tank |
| $T_3$ | Third tank |
| 100 | Multi-tank indirect liquid-level |
| 101 | System housing |
| 107 | Pressurization source (or |
| 111 | Diaphragm pressure gage |
| 120 | Normally closed pressure |
| 121 | Normally open push button |
| 122 | Battery |
| 130 | Pressure switch pneumatic |
| 132 | Pressure switch top cap |
| 134 | Pressure switch bottom cap |
| 136 | First electrical conductor |
| 138 | Second electrical conductor |
| 140 | Top cap to bottom cap connection |
| 142 | Electrical conductor plate |
| 144 | Coil spring |
| 146 | Sealed air chamber region |
| 148 | Diaphragm |
| 150 | Pressure plate |
| 152 | Vent hole |
| 200 | Tank selection unit |
| 202 | Selection unit housing groove |
| 204 | Selection unit housing |
| 206 | Inlet port |
| 208 | Mounting hole |
| 210 | Multi-port plug |
| 212 | First outlet port |
| 214 | Second outlet port |
| 216 | Third outlet port |
| 218 | Multi-port plug anti-rotation feature |
| 220 | Selection knob |
| 222 | Selection knob o-ring |
| 224 | Selection knob rotation indicator |
| 226 | Selection knob retainer clip groove |
| 228 | Selection knob groove |
| 230 | Port selector |
| 232 | Port selector o-ring |
| 234 | Port o-ring |
| 236 | Cylindrical port selector plug |
| 238 | Port selector spline |
| 240 | First flat washer |
| 242 | Second flat washer |
| 244 | Wave spring |
| 246 | Retainer clip |
| 248 | Selection unit pin |

-continued

| Number | Component or Feature |
|---|---|
| 250 | Rotation limiter |
| 252 | Port hole that connects to first outlet port (212) |
| 253 | Pressure relief hole |
| 254 | Port hole that connects to second outlet port (214) |
| 255 | Pressure relief hole |
| 256 | Port hole that connects to third outlet port (216) |
| 258 | Retainer clip access hole |

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It should be understood that various changes could be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, structures, and techniques may be shown without unnecessary detail in order to avoid obscuring the embodiments.

In one embodiment, the present disclosure provides a device suitable for use with one or more holding tanks of a recreational vehicle. Wastewater holding tanks are typically located downstream of a toilet, sink, shower, or any other place where water is used to clean something or where water is combined with other fluids or solids. There is typically also a freshwater holding tank to supply the toilet, sink, or shower. In this disclosure and the related claims, recreational vehicles include campers, motorized recreational vehicles, fifth wheelers, and trailers. These types of recreational vehicles most typically have two wastewater tanks and a freshwater tank or three wastewater tanks and a freshwater tank. In addition to recreational vehicles, vehicle holding tanks and embodiments of the invention can be used in other transportation applications such as boats, trains, buses, aircraft, or portable lavatories.

Figure 1B:
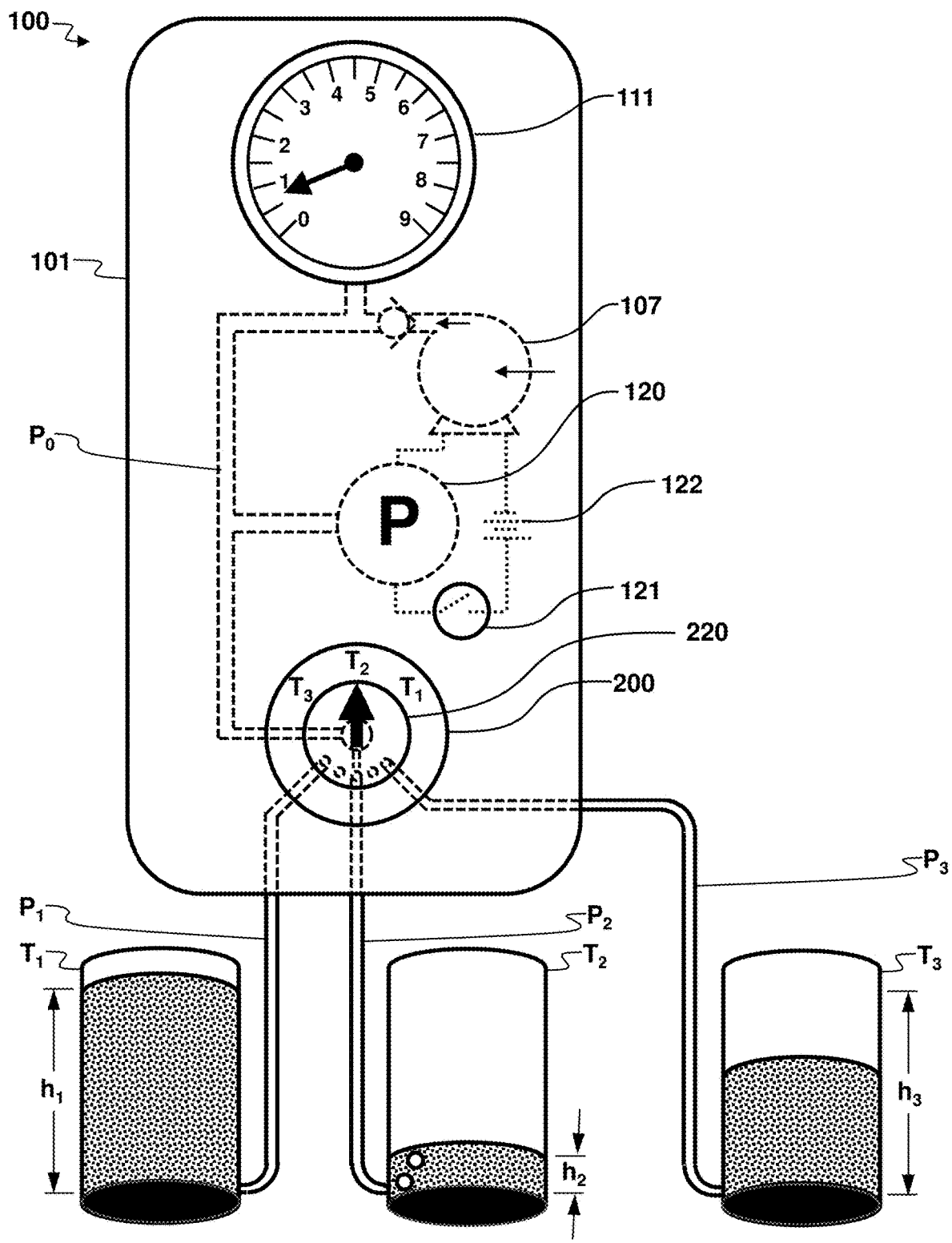
FIG. 1B shows the system of FIG. 1A measuring the liquid level in a second tank.
Figure 2:
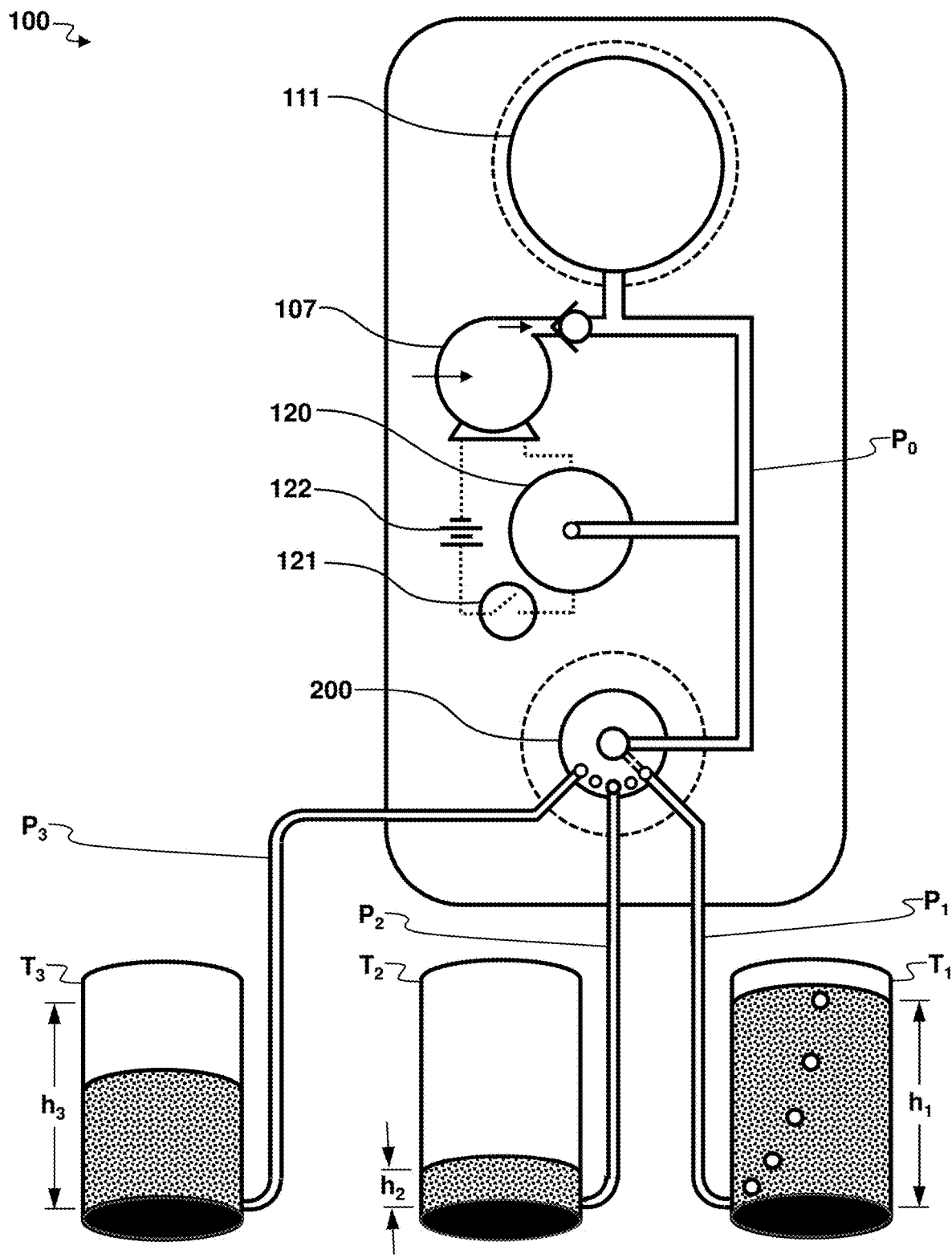
FIG. 2 shows a rear view of the system of FIG. 1A.

Embodiments of the invention rely on a principle that a height of a liquid in a tank can be measured from a pressure of a gas that is in communication with a bottom of the tank. This pressure communication can be (a) direct communication by bubbling excess gas out of a tube (or pipe) at the bottom of the tank, or (b) indirect communication through an interface that communicates pressure between the gas in the tube (or pipe) and the liquid in the bottom of the tank. Excess air is immediately disposed in the form of bubbles. The remaining air pressure is then equal to the liquid pressure at the air exit point. FIG. 1A, FIG. 1B, and FIG. 2 illustrate an example of this principle. Referring to FIG. 1A, a pump 107 pressurizes ambient air in a pipe system $P_0$ and $P_1$ until excess air escapes from an end of the pipe $P_1$ located at the bottom of the distant tank $T_1$. The pressure in the pipe system $P_0$ and $P_1$ can be read by a pressure reading instrument, such as a pressure gage 111. The pressure gage 111 could be calibrated in inches of water to indicate the height of the water $h_1$ in a first tank $T_1$. The pressure gage 111 could be any pressure reading device capable of being understood by anyone skilled in the art, including, but not limited to a diaphragm pressure gage, a manometer, or an electronic pressure transducer. In one embodiment, the pressure gage 111 is a diaphragm type gage comprising a dial and an indicator for showing pressure to a user.

The principle of operation just described can be applied to a complete multi-tank indirect liquid-level measurement system shown at 100 in FIG. 1A, FIG. 1B, and FIG. 2. In this complete system 100, there are three pipes (or tubes), shown at $P_1$, $P_2$, and $P_3$ that connect to three tanks, shown at $T_1$, $T_2$, and $T_3$, respectively, through a tank selection unit, shown at 200. By manually turning a selection knob 220 (shown in FIG. 1A and FIG. 1B) on the front of the tank selection unit 200, a user can selectively choose to measure the height of liquid $h_1$ in a first tank $T_1$ through a first pipe $P_1$, the height of liquid $h_2$ in a second tank $T_2$ through a second pipe $P_2$, or the height $h_3$ in a third tank $T_3$ through a third pipe $P_3$. More specifically, FIG. 1A shows a rotary selector knob 220 and other parts of a tank selection unit 200 connecting the main pipe (or tube) $P_0$ to the first pipe $P_1$, and FIG. 1B shows the rotary selector knob 220 and tank selection unit 200 connecting the main pipe (or tube) $P_0$ to the second pipe (or tube) $P_2$.

Referring to FIG. 1A, FIG. 1B, and FIG. 2, the tank selection unit 200, is connected to the main pipe (or tube) $P_0$, which is also connected to a pump 107, the pressure gage 111, and a normally-closed pressure switch 121, so that all of these components are connected to the same pressure. A battery 122 electrically powers the pump 107 and is in a series circuit that further comprises a normally-closed pressure switch 120, and a normally-open push-button switch 121. The normally-open push-button switch 121 is configured to be depressed by a user to power the pump 107 when the user desires a liquid level reading for a particular tank. The normally closed pressure switch 120 regulates the maximum pressure in the main pipe (or tube) $P_0$. This allows for the use of a low-cost pump 107, whose output pressure is unregulated and ensures that the pressure in the main pipe (or tube) $P_0$ never exceeds a maximum that could damage the pressure gage 111. One example of such a low-cost pump 107, is pump for aerating an aquarium tank. The entire system 100 can be mounted on a face plate or placed in a system housing, as shown at 101. Thus, the embodiments shown in FIG. 1A, FIG. 1B, and FIG. 2 would typically be used with either three wastewater tanks or with two wastewater tanks and a freshwater tanks. If the embodiment is used with three wastewater tanks, the freshwater tank could be measured in other ways, since it is least likely to get fouled and therefore not give accurate readings using prior art systems and methods.

FIG. 3A is an isometric view of a normally-closed pressure switch 120 that can be used in embodiments of the multi-tank system of FIG. 1A, FIG. 1B, and FIG. 2. FIG. 3B shows a side view of this pressure switch 120. FIG. 3C illustrates section A-A of FIG. 3B. As shown by these three drawings, the pressure switch 120 comprises a top cap 132, a bottom cap 134, and two electrical conductors 136 and 138, all of which are visible externally. The two electrical conductors, 136 and 138, in the embodiment shown, are hollow copper tubes configured for having an electrical wire crimped or soldered into the external ends. Also shown in FIG. 3A and FIG. 3C is a pneumatic port 130 that is configured for creating a pneumatic connection with the other pneumatic components that were shown in FIG. 1A, FIG. 1B and FIG. 2. In the embodiment shown the pneumatic port 130 is an aperture in the top cap 132 into which a flexible tube can be inserted.

In the section view of an embodiment of the pressure switch 120 shown in FIG. 3C, the top cap 132 is connected to the bottom cap 134 through the use of a connection element 140. In one embodiment, the connection element 140 is a cut piece of rigid polyvinyl chloride (PVC) tubing. When there is no pneumatic pressure being applied, the two electrical conductors 136 and 138 are electrically connected to each other through an electrical conductor plate 142 which is biased to press against the conductors 136 and 138 by a coil spring 144 that sits between the inside of the bottom cap 134 and the conductor plate 142. In a preferred embodiment, the electrical conductor plate 142 is a round plastic disk (which acts as an insulator) with an electrically conductive top surface, in the form of a copper film. The conductor plate 142 has a recess on the bottom side to provide clearance for the coil spring 144. The pressure switch 120 comprises a sealed air chamber region 146 that sits between the top cap 132 and a diaphragm 146. The diaphragm 146 has peripheral edges that form a gasket that is compressed between the top of the connection element 140 and the interior bottom surface of the top cap 132. In one embodiment, the diaphragm 148 is made from a commercially available finger cot that is mostly rolled up. These rolled up sections of the finger cot provide a large circular cross section that is compresses between the top cap 132 and the connection element 140.

When pressurized air enters through the pneumatic port 130 into the sealed air chamber region 146, the force of this air presses against a wall of the diaphragm 148 that is adjacent a pressure plate 150, that causes a downward force on the pressure plate 150 against the electrical conductor plate 142. This downward force counteracts the upward force on the electrical conductor plate 142 from the coil spring 144. If the pneumatic pressure in the chamber region 146 is high enough, the pressure plate 150 and electrical conductor plate 142 move down, which breaks the electrical connection between the first electrical conductor 136 and the second electrical conductor 138. The pressure at which the pressure switch 120 opens is a function of the diameter of the chamber region 146 and the compressive force of the coil spring 144, and this threshold pressure can be set to a desired value by choosing a suitable coil spring 144. A vent hole 152 in the bottom cap 134 allows air to escape from the unpressurized parts of the interior of the pressure switch. The connection element 140, electrical conductor plate 142, and coil spring 144 are retained in the bottom cap 134 by the two electrical conductors 136 and 138. The top cap 132 and other components can be attached to the bottom cap 134 using any attachment means capable of being understood by those skilled in the art, including, but not limited to:
  (a) Adhesives that attach the top cap 132 to the connection element 140 or to the bottom cap 134;
  (b) A label placed across the seam between the top cap 132 and bottom cap 134;
  (c) Fasteners, such as screws or clips; and/or
  (d) Snaps built into the top cap, bottom cap, or any other part of the assembly.

Figure 4:
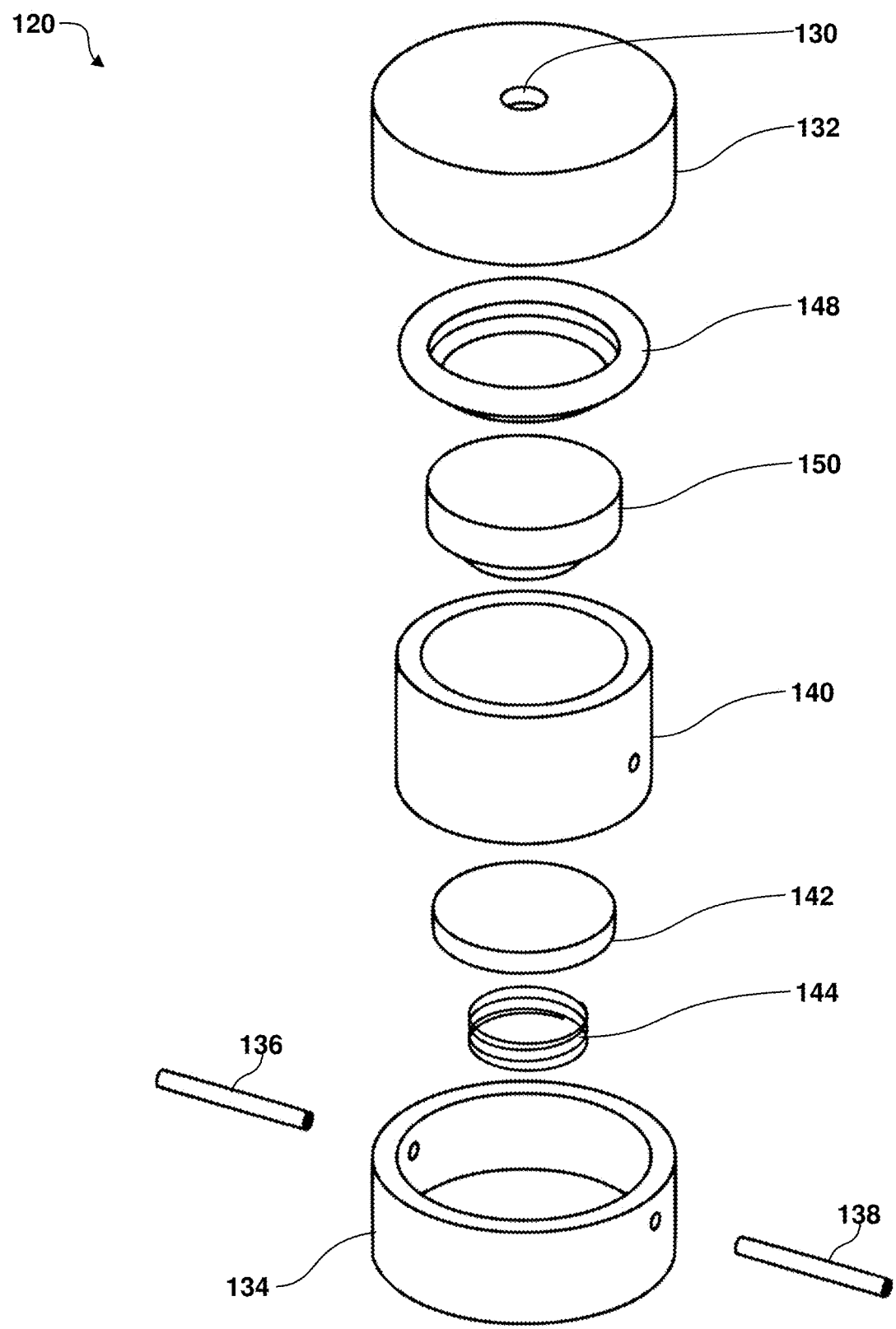
FIG. 4 and FIG. 5 are exploded views of the normally-closed pressure switch.
Figure 5:
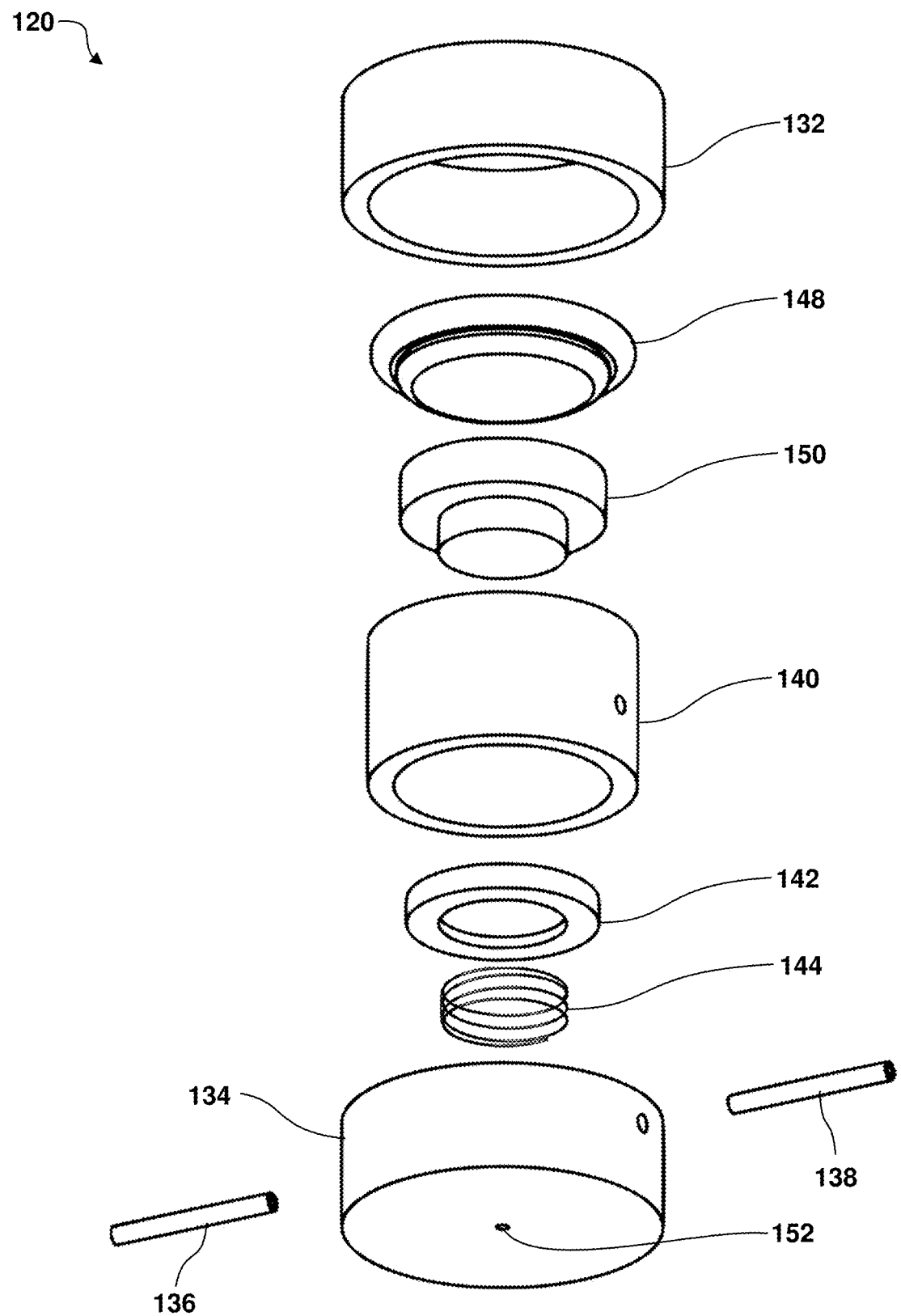

FIG. 4 and FIG. 5 provide exploded views of the components that comprise an embodiment of the normally closed pressure switch 120. More specifically, these illustrations show how the coil spring 144, electrical conductor plate 142, and connection element 140 fit into the bottom cap 134, to be retained when the two electrical conductors 136 and 138 are placed through the side holes of the bottom cap 134 and connection element 140. Once these parts are assembled together, the pressure plate 150 can be placed inside the connection element 140. Then the diaphragm 148 is placed with its rim on the walls of the connection element 140. The top cap 132 can then slide over the walls of the connection element 140 and be pressed down to provide the seal needed for the diaphragm 148. Finally, the entire assembly can be secured using one of the methods described earlier. Note that FIG. 4 shows the pneumatic port 130 in the top of the top cap 132 and FIG. 5 shows the vent hole 152 in the bottom of the bottom cap 134.

Figure 6A:
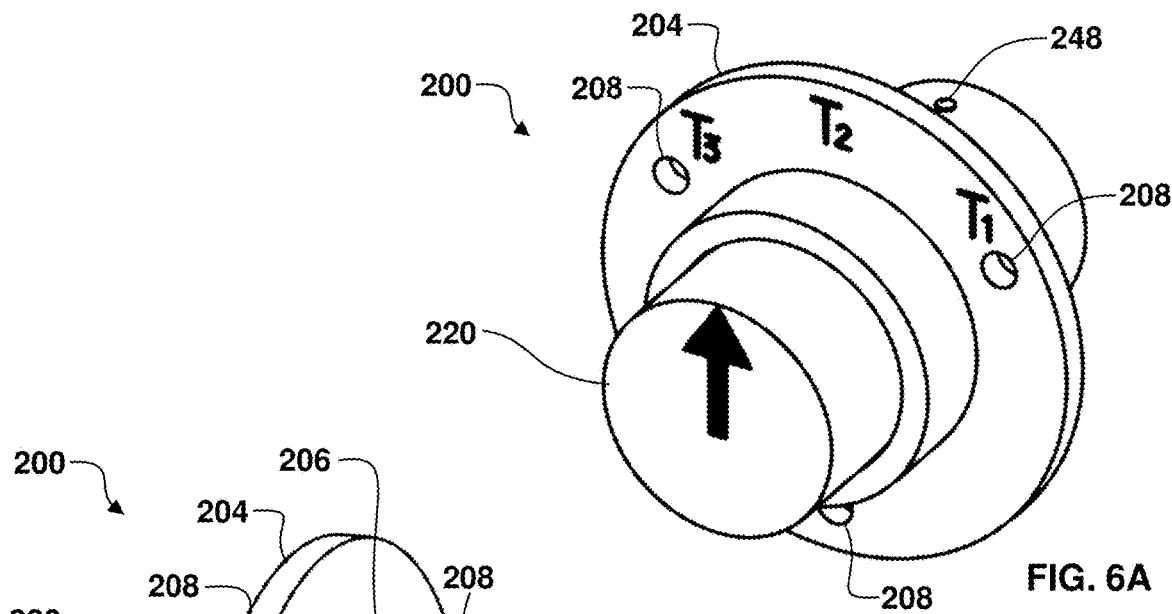
FIG. 6A and FIG. 6B are isometric views of a tank selection unit.
Figure 6B:
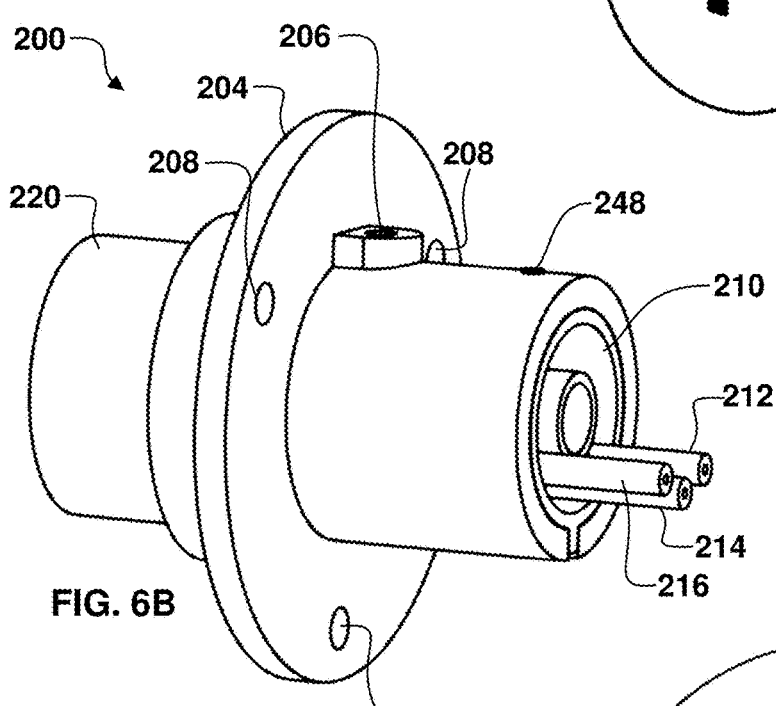
Figure 6C:
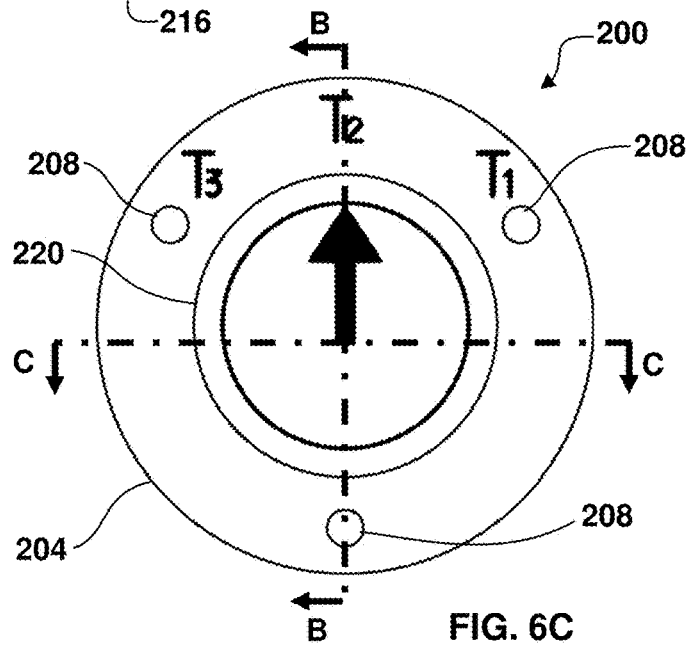
FIG. 6C is a front view of the tank selection unit.

FIG. 6A is an isometric view of a tank selection unit 200 that can be used in embodiments of the multi-tank system of FIG. 1A, FIG. 1B, and FIG. 2. FIG. 6B shows an alternate isometric view of this tank selection unit 200 to illustrate what can be seen in the rear of this unit. FIG. 6C shows a front view of this same tank selection unit 200. These views show the selection knob 220 that rotates inside the selection unit housing 204. These views show three mounting holes 208 in the selection unit 204 housing for attaching the tank selection unit 200 to a system housing or face plate (101 in FIG. 1A, FIG. 1B, and FIG. 2) FIG. 6B also shows an inlet port 206 (for connecting to $P_0$ in FIG. 1A, FIG. 1B, and FIG. 2) and three outlet ports 212, 214, and 216 for connecting to the three tanks that were shown at $T_1$, $T_2$, and $T_3$ in FIG. 1A, FIG. 1B, and FIG. 2. These ports 212, 214, and 216 are part of a multi-port plug 210 that will be further described later in this document.

Figure 7:
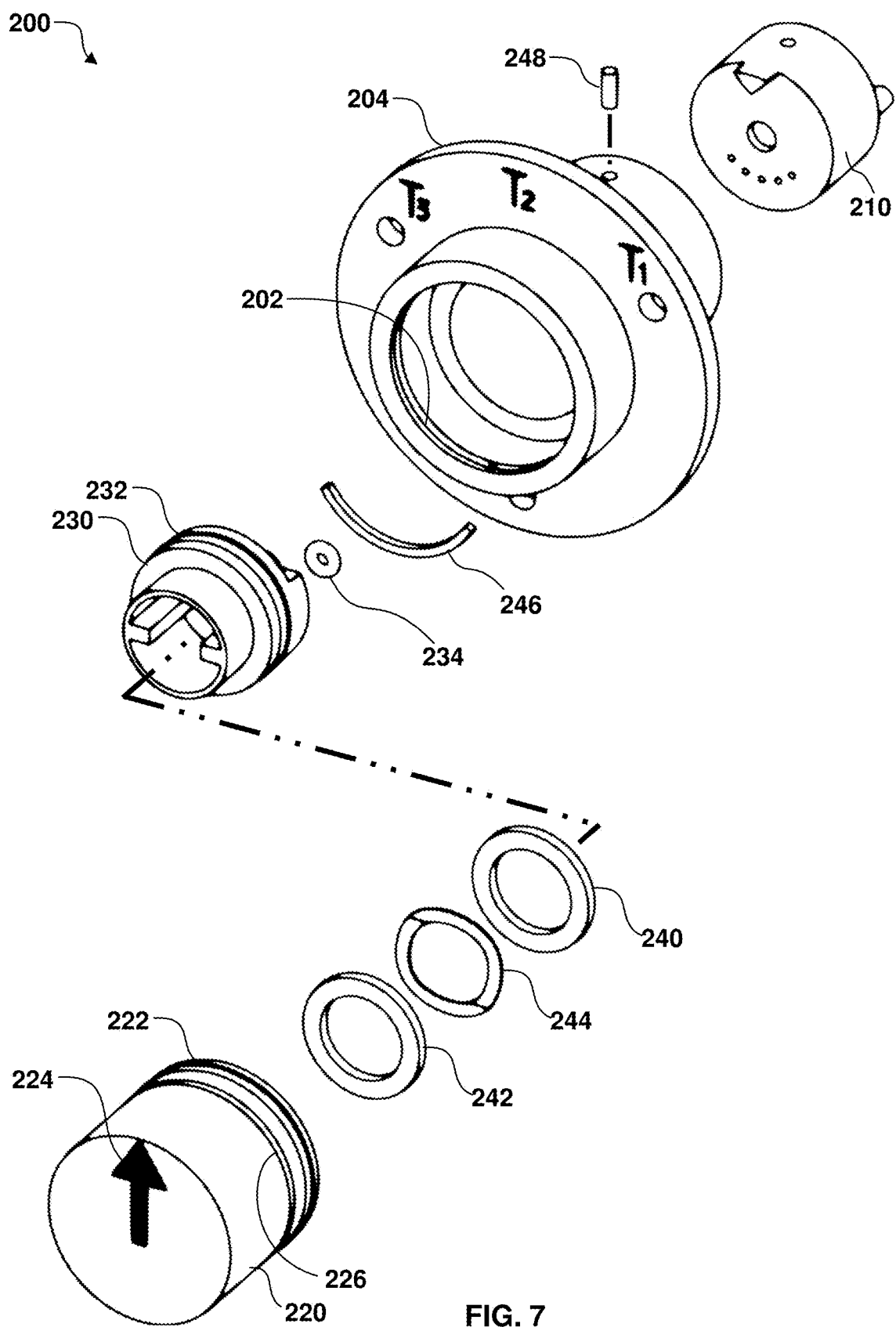
FIG. 7 is an exploded view of the tank selection unit.

FIG. 7 is an exploded view of the tank selection unit 200. When assembling the tank selection unit 200, the multi-port plug 210 is inserted into the rear of the selection unit housing 204. In one embodiment these two components are permanently attached to each other using a pin 248 (shown in FIG. 6A, FIG. 6B, FIG. 7, FIG. 8A, and FIG. 9), that goes into a hole drilled in the multi-port plug 210 and selection unit housing 204. This attachment of the multi-port plug 210 into the selection unit housing 204 can be performed using any technique and technology capable of being understood by anyone skilled in the art such as fasteners, screw threads, adhesives, snap fits, etc. The multi-port plug 210 and selection unit housing 204 could also be a monolithic (i.e., single piece) part. The selection knob 220 has a selection knob o-ring 222 placed in a rear groove of the selection knob 220. Similarly, the port selector 230 has a port selector o-ring 232 placed in a groove on the circumference of the port selector 230, and also has the port o-ring 234 inserted in a cylindrical cavity on the back side of the port selector 230 that is not visible in FIG. 7. Splines on the port selector 230 engage with slots inside the selection knob 220 when these two parts are assembled together. Two flat washers, 240 and 242, separated by a wave spring 244 sit between the selection knob 220 and the port selector 230 and all of these components are then inserted into the selection unit housing 204 and held in place by a retainer clip 246 that sits in a selection unit housing groove 202 and in a selection knob retainer clip groove 226. This configuration prevents axial movement of the selection knob 220 inside of the selection unit housing 204 while allowing the selection knob 220 to rotate inside of the selection unit housing 204. A selection knob rotation indicator 224 allows a user to see the current orientation of the selection knob 220 relative to tank selection indicia, shown as $T_1$, $T_2$, and $T_3$ on the selection unit housing 204.

FIG. 8A shows Section B-B of FIG. 6C, a section view taken in a vertical plane of the tank selection unit 200. FIG. 8B shows Sction C-C of FIG. 6C, a section view taken in a horizontal plane of the tank selection unit 200. Referring to these illustrations:

(a) The selection unit housing is shown at 204;
(b) The selection knob is shown at 220;
(c) The port selector is shown at 230; and
(d) The multi-port plug is shown at 210.

Further referring to FIG. 8A and FIG. 8B, the two flat washers 240 and 242 that are separated by the wave spring 244, sit between the selection knob 220 and port selector 230 and serve to press the port selector 230 against the multi-port plug 210. The multi-port plug 210 has been secured inside of the selection unit housing 204, as described previously with reference to FIG. 7. A selection knob o-ring 222 sits in a groove in the selection knob 220 that is inboard of the selection ring retainer clip groove 226. This seals the selection knob 220 against the interior wall of the selection unit housing 204. A port selector o-ring 232 sits in a groove in the port selector 230 to seal the port selector 230 against the interior wall of the selection unit housing 204.

FIG. 8B shows the three outlet ports 212, 214, and 216. The middle of these three ports 214, is visible in FIG. 8A. Referring in greater detail to FIG. 8A, this middle outlet port 214 is in fluid communication with an aperture in the port selector 230 when the selection knob 220 has rotated the port selector 230 to the position shown in FIG. 6C. FIG. 8A also shows that the port o-ring 234 sits in a recess in the port selector 230 to seal the fluid connection between the port selector 230 and the middle outlet port 214. Further referring to FIG. 8A, one can see that air can enter the inlet port 206 in the selection unit housing 204 into an interior region of the tank selection unit 200 and pass out the middle outlet port 214 for the second tank ($T_2$ as was shown in FIG. 1B). A clockwise rotation of the selection knob 220 and the rotationally coupled port selector 230 at a fixed angle would connect the interior region of the tank selection unit to the first tank ($T_1$ as was shown in FIG. 1A). Similarly, it can be understood that a counterclockwise rotation of the selection knob 220 and the rotationally coupled port selector 230 at a fixed angle would connect the interior region of the tank selection unit to the third tank ($T_3$ as can be inferred from looking at FIG. 1A and FIG. 1B and the description above).

FIG. 8A shows the retainer clip 246 that sits in a bottom region of the selection housing unit groove 202 and engages with the selection knob retainer clip groove 226 to axially retain the selection knob inside of the selection unit housing 204. The function of these grooves 202 and 226 will be further explained with reference to FIG. 12A, FIG. 12B, FIG. 12C, and FIG. 12D later in this document. FIG. 8A also shows the pin 248 that can be used to attach the multi-port plug 210 into the selection unit housing 204.

Figure 9:
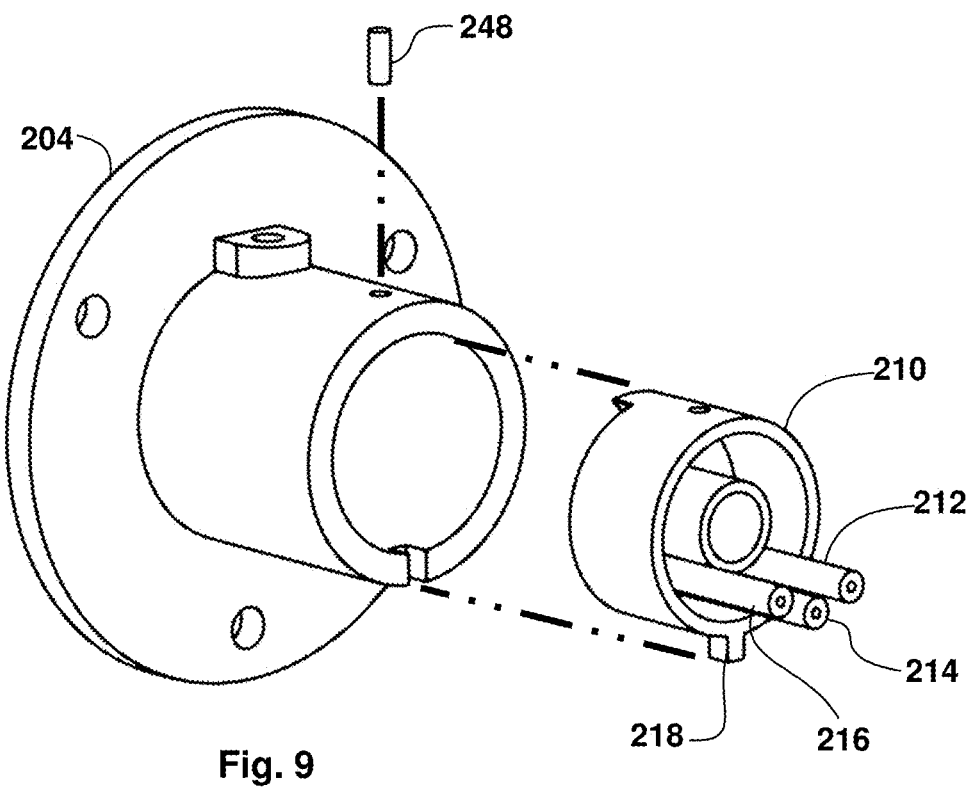
FIG. 9 shows the tank selection unit multi-port plug, selection unit housing, and pin.

FIG. 9 provides more details of how the multi-port plug 210 fits into the selection unit housing 204 and is secured by the selection unit pin 248 in one embodiment of the invention. From this illustration, it should be clear that the multi-port plug 210 fits inside a cylindrical interior of the housing 204 and is prevented from rotating by a multi-port plug anti-rotation feature 218 that fits into a slot in the housing 204. When assembled, the selection unit pin 248 fits into a hole in a wall of the housing 204 and into a wall of the multiport plug 210 to prevent the multi-port plug 210 from being removed from the housing 204.

Figure 10A:
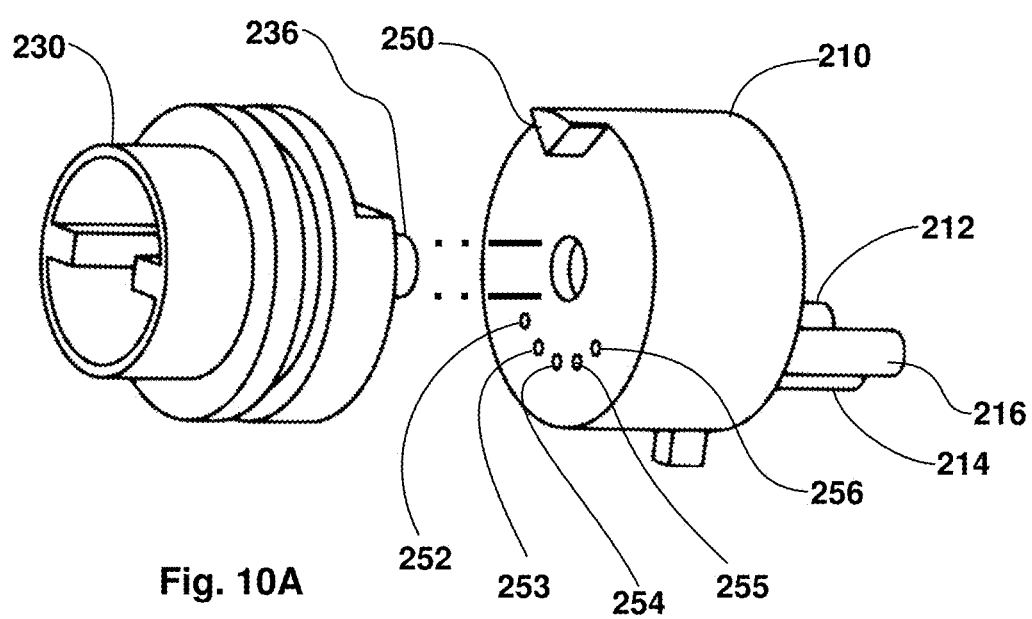
FIG. 10A, FIG. 10B, FIG. 10C, FIG. 10D, and FIG. 10E show the configuration and interaction of the multi-port plug and port selector.
Figure 10B:
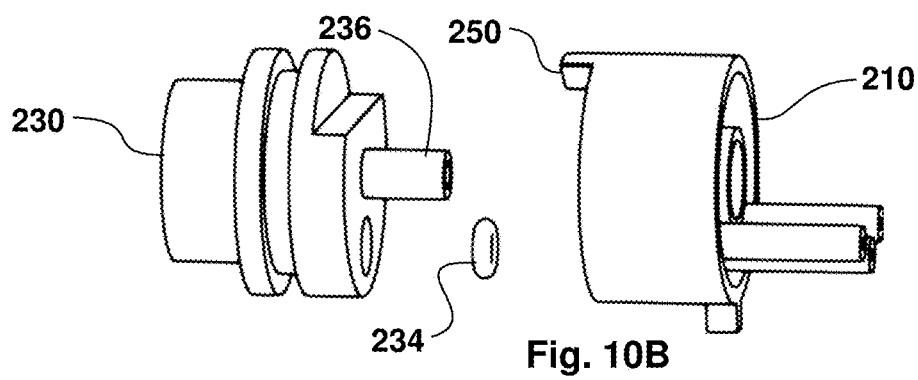
Figure 10C:
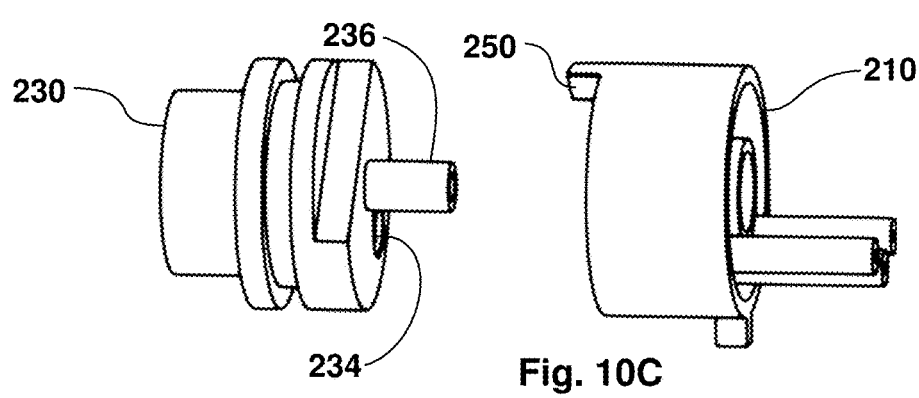
Figure 10D:
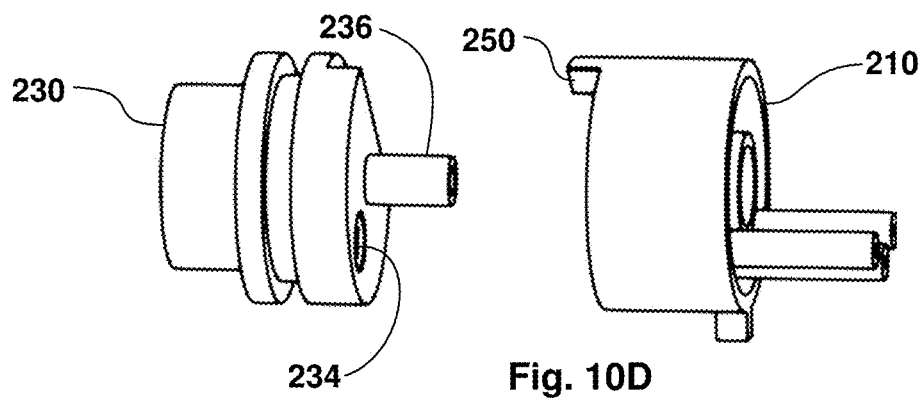
Figure 10E:
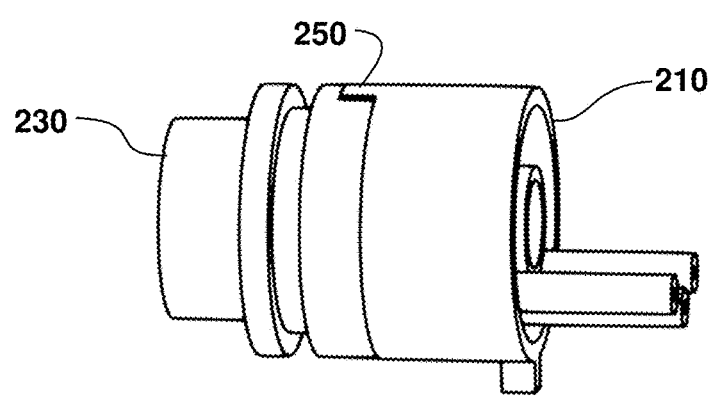

FIG. 10A, FIG. 10B, FIG. 10C, FIG. 10D, and FIG. 10E provide more detail about the port selector 230 and multi-port plug 210 and how these two parts function to select one of three outlet ports (see 212, 214, and 216 in 6B and FIG. 9). FIG. 10A and FIG. 10B show the port selector 230 in a middle position relative to the multi-port plug 210, which corresponds to the position of the selection knob 220 shown in FIG. 1B, for a connection to Tank 2 ($T_2$ in FIG. 1B). FIG. 10C show the port selector 230 in a position rotated 45 degrees clockwise relative to the multi-port plug 210 when compared to FIG. 10A and FIG. 10B, which corresponds to the position of the selection knob 220 shown in FIG. 1A, for a connection to Tank 1 ($T_1$ in FIG. 1B). FIG. 10D and FIG. 10E show the port selector 230 in a position rotated 45 degrees counter-clockwise relative to the multi-port plug 210 when compared to FIG. 10A and FIG. 10B, which corresponds to a connection to Tank 3 ($T_3$ in FIG. 1A and FIG. 1B). FIG. 10B shows the port o-ring 234 removed from the port selector 230. FIG. 10C, and FIG. 10D show the port o-ring 234 inserted in a cavity in the port selector 230.

FIG. 10A, FIG. 10B, FIG. 10C, FIG. 10D, and FIG. 10E also show that there is cutout in the top of the port selector 230 that engages with a rotation limiter 250 on the multi-port plug 210 to limit the rotation of the port selector 230 relative to the multi-port plug 210 to maximum rotations that correspond with connections to Tank 1, when rotated clockwise, and Tank 3, when rotated counter-clockwise. It should be noted that the cutout could also be on the multi-port plug 210 and the rotation limiter could be on the port selector 230 in embodiments of the invention.

It is noteworthy, and functionally beneficial that the multi-port plug 210 comprises five port holes, shown at 252, 253, 254, 255, and 256 in FIG. 10A. Of these five port holes: hole 252 connects with the first outlet port 212, hole 254 connects with the second outlet port 214, and hole 256 connects with the third outlet port 216. Port holes 253 and 255 sit between port holes 252, 254, and 256 and these two port holes 253 and 255 are pressure relief holes that function to equalize the pneumatic pressure in the system back to atmospheric pressure, and therefore re-zero the pressure gage (111 in FIG. 1A, FIG. 1B, and FIG. 1C) when the selection knob 220 and port selector 230 are rotated two switch the tank selection unit 200 to read a liquid level in a different tank.

Referring to FIG. 10A, FIG. 10B, FIG. 10C, and FIG. 10D, it should be noted that the port selector 230 comprises a cylindrical port selector plug 236 that engages with a cylindrical cavity in the multi-port plug 210 to provide rotational alignment between these two parts of the tank selection unit 200.

Figure 11A:
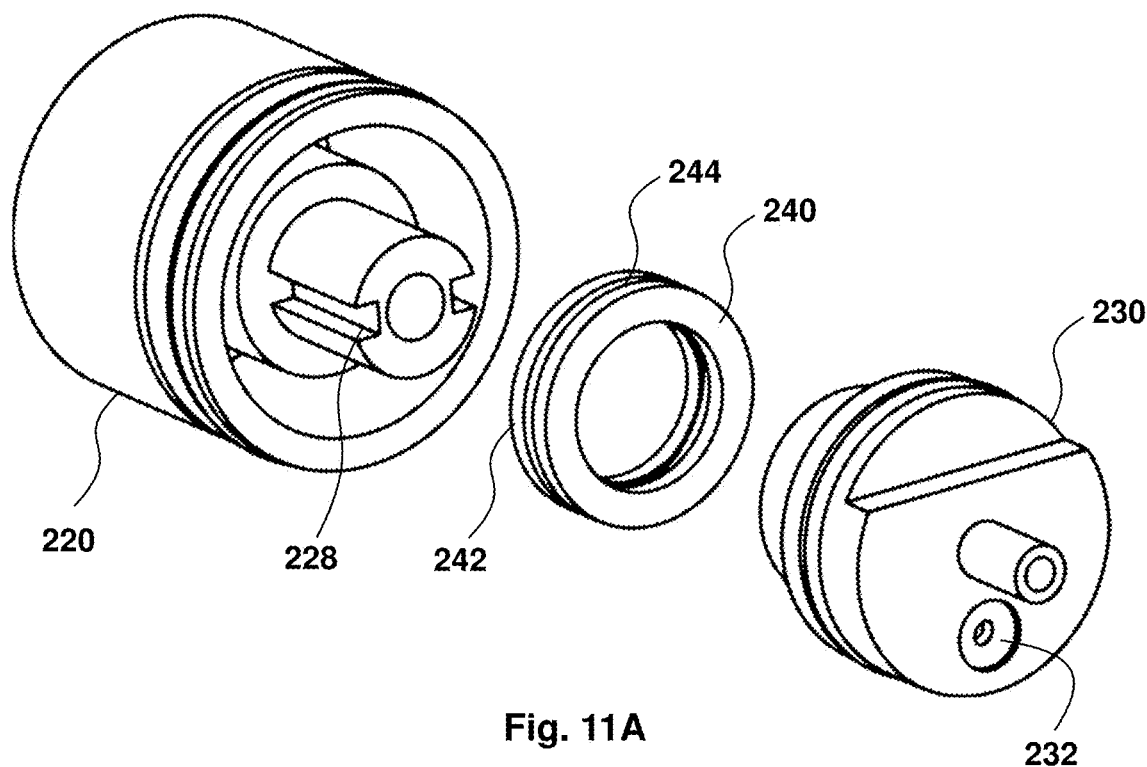
FIG. 11A and FIG. 11B show the configuration and interaction of the selection knob and port selector.
Figure 11B:
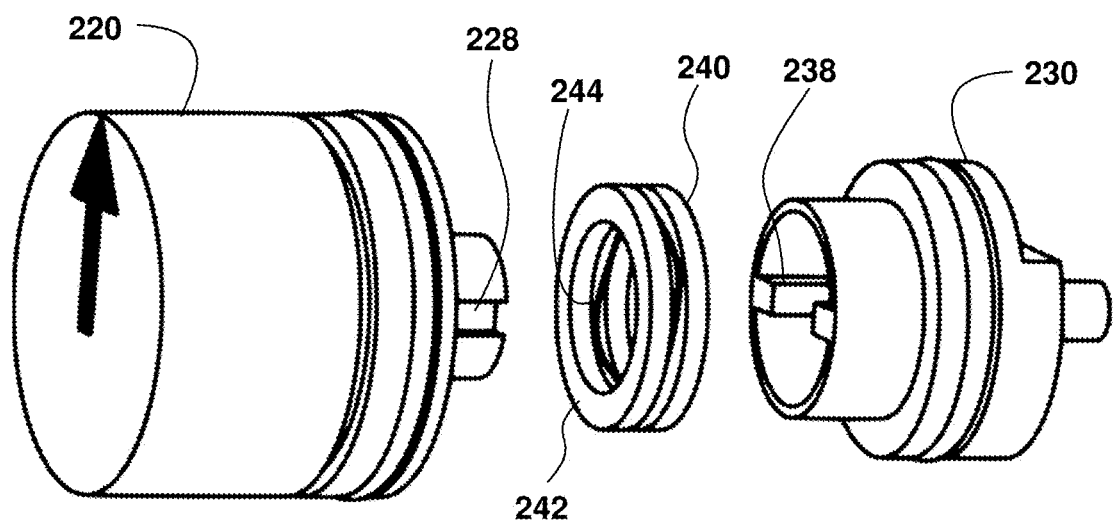

FIG. 11A and FIG. 11B are two views that illustrate the interface between the selection knob 220 and the port selector 230. The selection knob 220 comprises selection knob grooves 228 that engage with port selector splines 238 in the port selector 230 to provide rotational coupling between the selection knob 220 and the port selector 230. Thus, rotation of the selection knob 220 causes a rotation of the port selector 230, which results in one of three outlet ports (212, 214, or 216 in FIG. 6B, FIG. 8B, FIG. 9, and FIG. 10A) to be selected for a pneumatic connection between the inlet port (206 in FIG. 6B and FIG. 8B) and the bottom of a particular tank ($T_1$, $T_2$, or $T_3$ in FIG. 1A, FIG. 1B, and FIG. 2).

FIG. 8A, FIG. 8B, FIG. 11A and FIG. 11B illustrate that the wave spring 244 sandwiches between the first flat washer 240 and the second flat washer 242 and that this set of parts fits around a boss on the selection knob 220. When the tank selection unit is assembled, these two washers 240 and 242 and wave spring 224 are pressed between a shoulder on the selection knob 220 and an end surface on the port selector 230 to provide a force that axially compresses the port selector 230 against the multi-port plug (210 in FIG. 8A and FIG. 8B) which ensures that the port selector o-ring 232 seals against the multi-port plug (210 in FIG. 8A and FIG. 8B).

FIG. 12A, FIG. 12B, FIG. 12C, and FIG. 12D illustrate how the retainer clip 246 can be used to hold the tank selection unit 200 together and allow it to be disassembled, if needed. More specifically, FIG. 12A shows a bottom view and FIG. 12B shows a bottom isometric view of the tank selection unit 200. FIG. 12C shows section D-D of FIG. 12A. FIG. 12D shows section E-E of FIG. 12A for only the selection unit housing 204 and retainer clip 246 sitting in the selection unit housing groove 208. All of these drawings show a retainer clip access hole 258 that is in the bottom of the selection unit housing (204 in FIG. 12D) in a location that provides access to the selection unit housing groove (208 in FIG. 12C and FIG. 12D). Referring to FIG. 12C, it can be seen that the retainer clip 246 has a radius of curvature less than the radius of curvature of the retainer selection unit housing groove 202, which causes the retainer clip 246 to arch into the selection knob retainer clip groove 226 and thereby prevent axial movement of the selection knob 220 relative to the selection unit housing 204. To disassemble the tank selection unit (200 in FIG. 12A and FIG. 12B), a pin can be pressed into the retainer clip access hole 258 to press the retainer clip 246 completely into the selection knob retainer clip groove 226, allowing the selection knob 220 to be pulled out of the selection unit housing 204. It can be understood that this will only work if the retainer clip 246 is sufficiently springy that it can elastically deform to match the radius of the selection knob retainer clip groove 226. The selection unit housing groove 202 and selection knob retainer clip groove 226 can also be seen in FIG. 8A and FIG. 8B, to further clarify the location and function of these elements of the tank selection unit 200.

A number of variations and modifications of the disclosed embodiments can also be used. The principles described here can also be used for in applications other than recreational vehicles such as bioreactors, etc. While the principles of the disclosure have been described above in connection with specific apparatuses and methods, it is to be clearly understood that this description is made only by way of example and not as limitation on the scope of the disclosure.

What is claimed is:

1. A holding tank liquid level measuring system, wherein:
    the system is configured for measuring liquid levels in a plurality of recreational vehicle holding tanks:
    the system comprises an air pump, a pressure indicating device, a pressure switch, a user-operated electrical switch, and a tank selection unit;
    the air pump comprises an electrically-powered air pump;
    the air pump is responsive to the user-operated electrical switch to turn the pump on;
    the pressure indicating device, pressure switch, and an inlet of the tank selection unit are in pressure communication with an outlet of the air pump;
    the pressure indicating device is configured to display a measurement of an air pressure at the outlet of the air pump;
    the pressure switch comprises a normally-closed air pressure switch that is configured to turn off the air pump when the pressure at the outlet of the air pump exceeds a pre-determined threshold value;
    the tank selection unit is configured to selectively connect the inlet of the tank selection unit to tubes that are in pressure communication with bottoms of the plurality of recreational vehicle holding tanks;
    the tank selection unit comprises a tank selection unit housing, a selection knob, a port selector, and a multi-port plug;
    the selection knob is retained inside a cylindrical interior of the tank selection unit housing by a retainer clip that engages with a groove in a wall of the cylindrical interior of the tank selection unit housing and engages with a groove in an exterior cylindrical surface of the selection knob.

2. The system of claim 1 wherein:
    the system further comprises a direct current electrical circuit;
    the system further comprises a battery;
    the battery is configured for electrically powering the air pump; and
    the user-operated switch comprises a normally-open push-button switch.

3. The system of claim 2 wherein:
    the pressure switch comprises a top cap, a bottom cap, a pressure switch inlet, an interior region, a diaphragm, a first electrical conductor, a second electrical conductor, an electrical conductor plate, and a coil spring;
    the pressure switch inlet is configured to connect the interior region of the pressure switch to the outlet of the air pump;
    the coil spring biases the electrical conductor plate against the first electrical conductor and the second electrical conductor to make an electrically conductive path from the first electrical conductor to the second electrical conductor when the pressure in the interior region is below the pre-determined threshold value;
    the electrical conductor plate is pushed away from the first electrical conductor and the second electrical conductor in response to movement of the diaphragm when the pressure in the interior region exceeds the pre-determined threshold value.

4. The system of claim 3 wherein:
    the electrical conductor plate is pushed away from the first electrical conductor and the second electrical conductor in response to movement of a pressure plate that engages with the diaphragm on a first side and engages with the electrical conductor plate on a second side, wherein the second conductor plate section side is opposite of the conductor plate first side; and
    the diaphragm comprises a finger cot.

5. The system of claim 1 wherein:
    the tank selection unit housing comprises an inlet port for the tank selection unit;
    the inlet port of the tank selection unit is configured for a pneumatic connection with an interior of the tank selection unit;
    the multi-port plug is configured for fixed and permanent attachment to the tank selection unit housing;
    the multi-port plug comprises three outlet ports configured for connection to three air lines, that are configured for pressure communication with the bottoms of three recreational vehicle holding tanks;
    the port selector is configured to rotate inside a cylindrical interior of tank selection unit housing to selectively provide a pneumatic connection between the interior of the tank selection unit and each of the three outlet ports;
    the selection knob is rotationally coupled to the port selector; and
    the selection knob is configured to rotate inside the tank selection unit housing in response to a manual input.

6. The system of claim 1 wherein:
the multi-port plug comprises three outlet ports configured for connection to three air lines, that are configured for pressure communication with the bottoms of three recreational vehicle holding tanks; and
the multi-port plug comprises two pressure relief holes located between the three outlet ports wherein the pressure relief holes are configured for equalizing the pressure inside the system to atmospheric pressure when an outlet port of port selector is rotated from a position aligned with a first outlet port of the multi-port plug to a position aligned with a second outlet port of the multi-port plug.

7. The system of claim 1 wherein:
the pressure switch comprises a diaphragm, a coil spring, and an electrical conductor;
the coil spring biases the electrical conductor to allow current to pass through the pressure switch when the pressure at the outlet of the air pump is below the pre-determined threshold value; and
the diaphragm counteracts the force of the coil spring to prevent current from passing through the pressure switch when the pressure at the outlet of the air pump is above the pre-determined threshold value.

8. The system of claim 1 wherein:
the port selector is permanently attached to the selection unit housing using a pin; and
the port selector is held inside of the selection unit housing and between the selection knob and the multi-port plug.

9. The system of claim 1 wherein:
the system is configured for measuring the liquid level in at least two wastewater holding tanks and at least one freshwater tank of the recreational vehicle.

10. The system of claim 1 wherein:
the pressure indicating device comprises a dial-type diaphragm pressure gage.

11. The system of claim 1 wherein:
the selection knob is sealed against an interior cylindrical diameter of the tank selection unit housing with an o-ring;
the port selector is sealed against the interior cylindrical diameter of the tank selection unit with an o-ring; and
the port selector is sealed against the multi-port plug with an o-ring.

12. The system of claim 1 wherein:
the port selector is permanently attached to the selection unit housing; and
the port selector sits between the selection knob and the multi-port plug and presses against the multi-port plug in response to a wave spring sandwiched between two washers that sit between the selection knob and the port selector.

13. The system of claim 1 wherein:
the tank selection unit is configured for mounting on a face plate that is mounted on a wall of the recreational vehicle;
the tank selection unit comprises a selection knob that is configured for selecting a tank from the plurality of recreational vehicle holding tanks in response to a manual rotation of the selection knob about an axis perpendicular to the wall of the recreational vehicle.

14. An apparatus for indicating the depth of a liquid in a plurality of tanks, wherein:
the apparatus comprises an air pump, a pressure indicating device, a pressure switch, a tank selection unit, and a user-operated electrical switch that are organized into an air tube system and an electrical circuit;
the air tube system is configured for selectively and pneumatically communicating air pressure between:
a bottom of a tank selected from the plurality of tanks;
the pump, wherein the pump further comprises an electrically-powered air pump;
the pressure switch; and
the pressure indicating device;
the tank selection unit comprises a multi-port plug;
the multi-port plug comprises:
a plurality of outlet ports configured for connection to a plurality of air lines that are configured for pressure communication with the bottoms of the plurality of tanks; and
at least one pressure relief hole configured for equalizing the pressure inside the system to atmospheric pressure when an outlet port of port selector is rotated from a position aligned with a first outlet port of the multi-port plug to a position aligned with a second outlet port of the multi-port plug; and
the electrical circuit comprises:
an electrical current source configured for powering the pump;
a manual switch configured for manually turning the pump on and off; and
the pressure switch, wherein the pressure switch is configured for turning off the pump when the pressure in the air tube system exceeds a threshold value.

15. The apparatus of claim 14 wherein:
the plurality of tanks comprise recreational vehicle holding tanks;
the tank selection unit further comprises a tank selection unit housing, a selection knob, and a port selector;
the selection knob is sealed against an interior cylindrical diameter of the tank selection unit housing with an o-ring;
the port selector is sealed against the interior cylindrical diameter of the tank selection unit with an o-ring; and
the port selector is sealed against the multi-port plug with an o-ring.

16. The apparatus of claim 14 wherein:
the electrical circuit comprises a direct current circuit;
the electrical current source comprises a battery;
the manual switch comprises a normally-open push button switch;
the apparatus is configured for indicating the depth of a liquid in a plurality of recreational vehicle holding tanks;
the tank selection unit is configured for manual selection of the tank from a plurality of recreational vehicle wastewater tanks;
the tank selection unit is configured for manual selection of the tank in response to a manual rotation of a tank selection unit actuator;
the tank selection unit further comprises a selection disk that is responsive to a rotation of the tank selection unit actuator to selectively and exclusively connect one of said plurality of recreational vehicle wastewater tanks to said air tube system; and
the pressure indicating device further comprises a dial type diaphragm pressure gage.

17. The system of claim 14 wherein:
the pressure switch comprises a top cap, a bottom cap, an inlet, an interior region, a diaphragm, a first electrical conductor, a second electrical conductor, an electrical conductor plate, and a coil spring;

the inlet is configured to connect the interior region of the pressure switch to the outlet of the air pump;

the coil spring biases the electrical conductor plate against the first electrical conductor and the second electrical conductor to make an electrically conductive path from the first electrical conductor to the second electrical conductor when the pressure in the interior region is below the threshold value;

the electrical conductor plate is pushed away from the first electrical conductor and the second electrical conductor in response to movement of the diaphragm when the pressure in the interior region exceeds the threshold value.

18. The system of claim 14 wherein:

the tank selection unit further comprises a tank selection unit housing, a selection knob, and a port selector;

the tank selection unit housing comprises an inlet port configured for a pneumatic connection of an outlet of the air pump with an interior of the tank selection unit;

the multi-port plug is configured for permanent attachment to the selection unit housing;

the multi-port plug comprises three outlet ports configured for connection to three air lines, that are configured for pressure communication with bottoms of three recreational vehicle holding tanks;

the port selector is configured to rotate inside the tank selection unit housing to selectively provide a pneumatic connection between the interior of the tank selection unit and each of the three outlet ports;

the selection knob is rotationally coupled to the port selector;

the selection knob is configured to rotate inside the tank selection unit housing in response to a manual input; and the selection knob is retained inside a cylindrical interior of the tank selection unit housing by a retainer clip that at least partially sits in a groove in a walls of the cylindrical interior of the tank selection unit housing and sits at least partially in a groove in an exterior cylindrical surface of the selection knob.

19. A method for measuring the depth of liquid in a plurality of tanks, wherein:

the method comprises providing an air pump, a plurality of air tubes, a user-actuated electrical switch, a pressure switch, a tank selection unit, a pressure indicating device, and a battery, wherein:

the tank selection unit comprises a tank selection unit housing and a selection knob; and the selection knob is retained inside a cylindrical interior of the tank selection unit housing by a retainer clip that engages with the cylindrical interior of the tank selection unit housing;

placing one end of each of the plurality of air tubes in the bottoms of each of the plurality of tanks;

putting the other end of each of the plurality of air tubes in pressure communication with the outlet of the air pump, the pressure indicating device, and the pressure switch;

using the battery to start powering the air pump when the user-actuated electrical switch is closed and to stop powering the air pump when the pressure switch responds to a threshold pressure;

using the pressure indicating device to read the pressure of the air in at least one of the air tubes.

20. The method of claim 19 wherein:

the tank selection unit further comprises, a port selector and a multi-port plug;

the tank selection unit housing comprises an inlet port configured for a pneumatic connection of the outlet of the air pump with an interior of the tank selection unit;

the multi-port plug is configured for fixed permanent attachment to the selection unit housing;

the multi-port plug comprises three outlet ports configured for connection to three air lines, that are configured for pressure communication with bottoms of three recreational vehicle holding tanks;

the port selector is configured to rotate inside the tank selection unit housing to selectively provide a pneumatic connection between the interior of the tank selection unit and each of the three outlet ports; and the selection knob is rotationally coupled to the port selector; and manually selecting a tank from the plurality of tanks in response to a rotation of the selection knob.

* * * * *